US005898985A

United States Patent [19]

Villarreal

[11] Patent Number: 5,898,985

[45] Date of Patent: May 4, 1999

[54] BUSHING REMOVAL TOOL

[75] Inventor: Luis Villarreal, Waterford, Mich.

[73] Assignee: Chrysler Corporation, Auburn Hills, Mich.

[21] Appl. No.: 08/918,831

[22] Filed: Aug. 26, 1997

[51] Int. Cl.[6] .......... B23P 19/04

[52] U.S. Cl. .......... 29/257

[58] Field of Search .......... 29/251, 270, 257, 29/281.1, 256; 269/249

[56] References Cited

U.S. PATENT DOCUMENTS

| | | | |
|---|---|---|---|
| 1,344,700 | 6/1920 | Loomis | 29/257 |
| 1,469,594 | 10/1923 | Harley | 29/257 |
| 1,498,638 | 6/1924 | Periolat | 29/257 |
| 1,511,909 | 10/1924 | Rogness | 29/257 |
| 1,669,899 | 5/1928 | Coffer | 29/257 |

*Primary Examiner*—Robert C. Watson
*Attorney, Agent, or Firm*—James R. Yee

[57] ABSTRACT

A bushing removal tool includes a pressing mechanism and a threaded rod threaded through the pressing mechanism. The bushing removal tool also includes a bushing press adaptor fitting onto an end of the threaded rod. The bushing removal tool further includes a bushing receiver fitting onto the pressing mechanism and opposing the bushing adaptor.

21 Claims, 3 Drawing Sheets

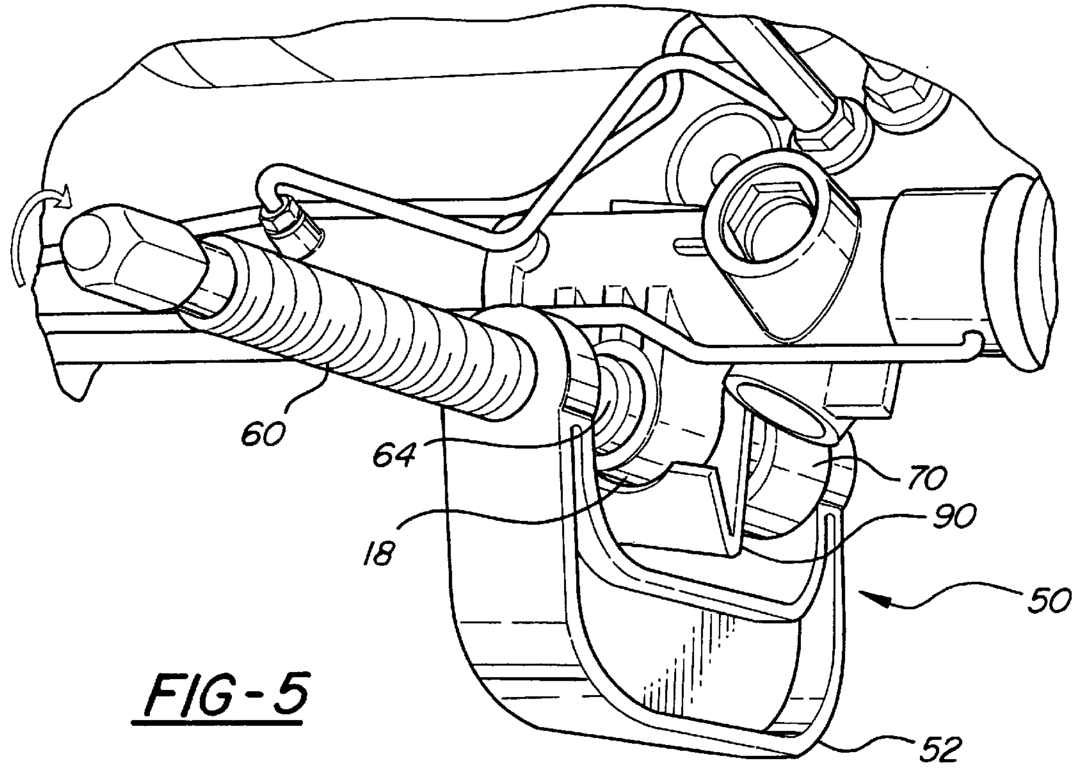
FIG-5
FIG-6
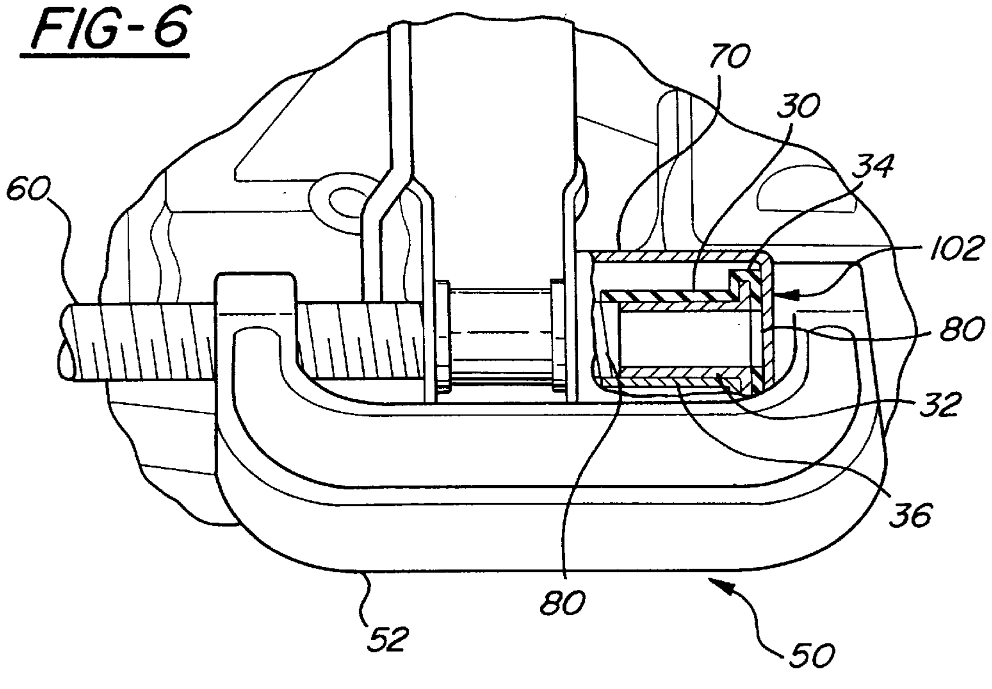

BUSHING REMOVAL TOOL

BACKGROUND OF THE INVENTION

1. Field of the Invention

The present invention relates generally to tools for motor vehicles and, more particularly, to a bushing removal tool for a rack and pinion gear of a motor vehicle.

2. Description of the Related Art

A bushing, as well known in the art, is a sleeve that provides structural support to an opening in a member. For example, a power steering system in a motor vehicle includes a rack and pinion gear having a mounting portion for bolting the rack and pinion gear to a cross member of the motor vehicle. The mounting portion includes an aperture and a bushing compressedly fitting within the aperture.

Extraction of the bushing from the aperture requires a significant level of force. An arbor press, as is well known in the art, is able to provide the necessary level of force required to push the bushing out of the aperture. However, the rack and pinion gear must first be removed from the motor vehicle in order to use the arbor press. This involves removing the tire and wheel from the motor vehicle, disconnecting a power steering line and draining any power steering fluid, before unbolting the rack and pinion gear. Thus, there is a need in the art for a hand-held bushing removal tool that provides adequate leverage to force out a bushing.

SUMMARY OF THE INVENTION

It is, therefore, one object of the present invention to provide a bushing removal tool.

It is another object of the present invention to provide a bushing removal tool that is hand held.

It is yet another object of the present invention to provide a bushing removal tool to remove a bushing from a rack and pinion steering gear in a motor vehicle.

To achieve the foregoing objects, the present invention is a bushing removal tool. The bushing removal tool includes a pressing mechanism and a threaded rod threaded through the pressing mechanism. The bushing removal tool also includes a bushing press adaptor fitting onto an end of the threaded rod. The bushing removal tool further includes a bushing receiver fitting onto the pressing mechanism and opposing the bushing adaptor.

One advantage of the present invention is that a bushing removal tool is provided for a motor vehicle that has sufficient leverage to push a bushing out of an aperture. Another advantage of the present invention is that the portability of the bushing removal tool makes it convenient to use even in areas where access is limited. Still another advantage of the present invention is that the bushing removal tool can be used to extract a bushing from a rack and pinion gear with the rack and pinion gear still located on the motor vehicle.

Other objects, features and advantages of the present invention will be readily appreciated as the same becomes better understood after reading the subsequent description when considered in connection with the accompanying drawings.

BRIEF DESCRIPTION OF THE DRAWINGS

FIG. 5 is a perspective view of the bushing removal tool of FIG. 3 including an adaptor plate for removing the bushing from the rack and pinion gear of FIG. 1.

FIG. 6 is a cut-away side view of the bushing removal tool of FIG. 3 removing the bushing from the rack and pinion gear of FIG. 1.

DESCRIPTION OF THE PREFERRED EMBODIMENT(S)

Figure 1:
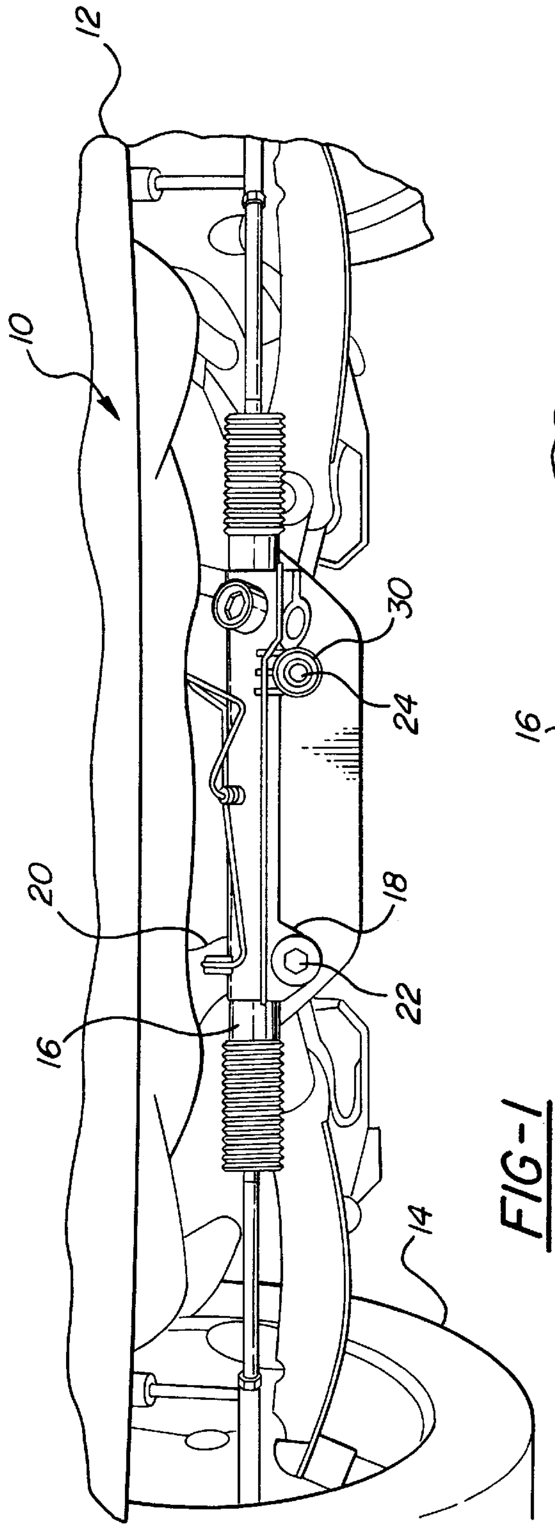
FIG. 1 is a partial elevational view of a rack and pinion gear on a motor vehicle.

Referring to FIG. 1, one embodiment of a power steering mechanism 10 for a motor vehicle 12 (partially shown) is illustrated. The power steering mechanism 10 converts rotary motion of a steering wheel (not shown) into a turning motion for a wheel 14 of the motor vehicle 12. The power steering mechanism 10 includes a rack and pinion gear 16 connected to two of the wheels 14 to accomplish the translation of motion, as is well known in the art. The rack and pinion gear 16 includes a mounting portion 18 for mounting the rack and pinion gear 16 to a cross member 20 positioned between a frame (not shown) of the motor vehicle 12, using a mounting fastener 22 such as a bolt. The bolt 22 fits within a mounting aperture 24 in the rack and pinion gear 16. Preferably, the mounting aperture 24 includes a bushing 30 within the mounting aperture 24 to provide structural support to the mounting aperture 24 and inhibit the transmission of a vibration from the frame up through the steering wheel.

The bushing 30 (FIG. 6) includes a metal sleeve 32. In this example, one end of the metal sleeve 32 includes a shoulder portion 34. It should be appreciated that, in this example, the metal sleeve 32 and shoulder portion 34 are encased by a rubber outer covering 36. The rubber outer covering 36 acts as an isolator in reducing the transmission of vibration from the frame of the vehicle 12 to the steering wheel.

The bushing 30 is maintained within the mounting aperture 24 by a compression fit, such that the shoulder portion 34 extends beyond the mounting portion 18. During installation of the bushing 30, the rubber outer covering 36 is compressed. However, after installation, the rubber outer covering 36 returns to its original size to assist in retaining the bushing 30 within the mounting aperture 24.

There are times when it may be desirable to perform multiple bushing 30 changes, such as in determining an appropriate rubber material for the bushing 30. However, as previously described, it may be difficult and time consuming to remove the bushing 30.

Figure 2:
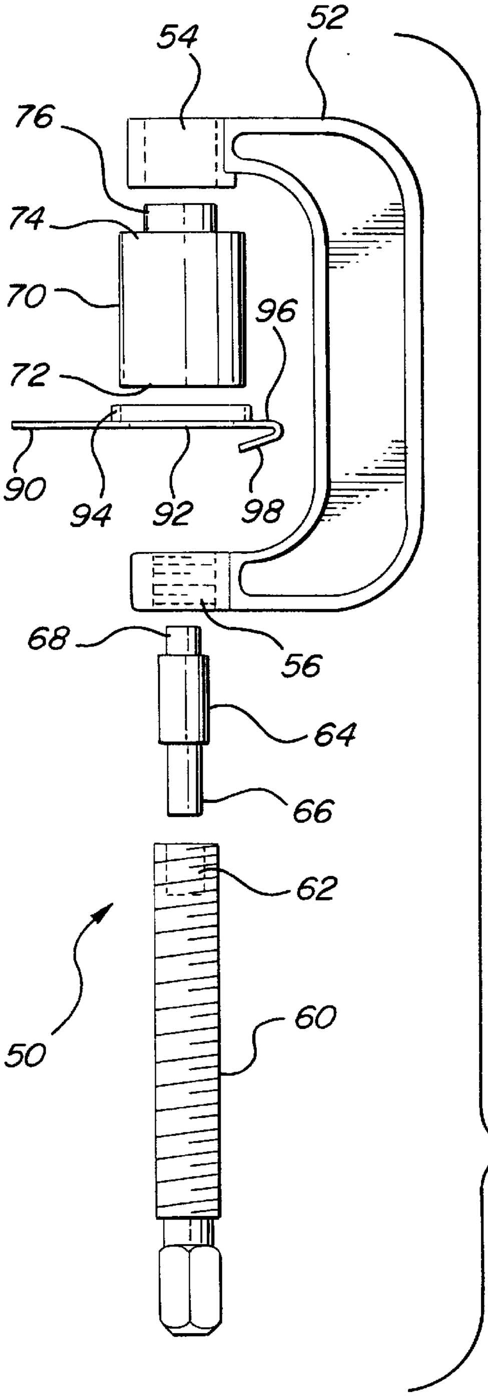
FIG. 2 is an exploded elevational view of a bushing removal tool, according to the present invention, for removing a bushing for the rack and pinion gear of FIG. 1.
Figure 3:
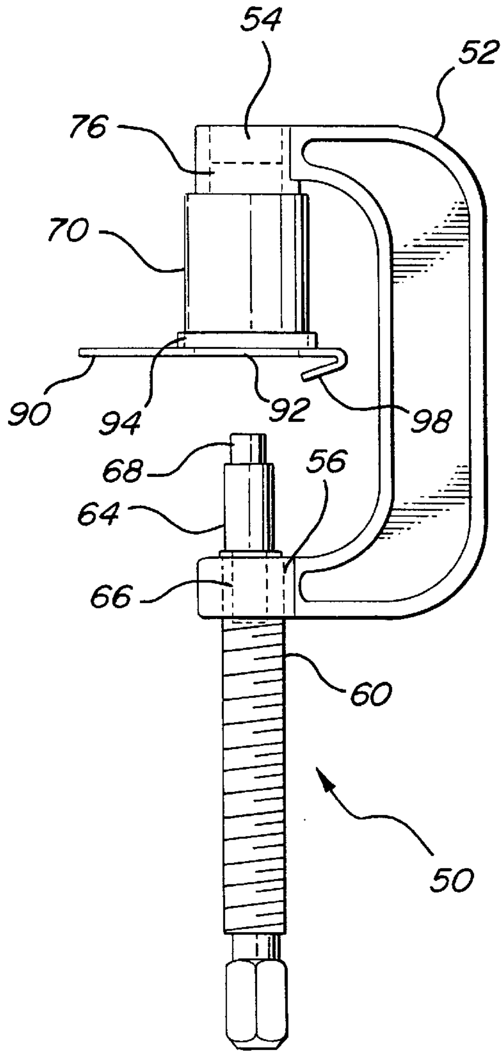
FIG. 3 is an elevational view of the assembled bushing removal tool of FIG. 2.

Referring to FIGS. 2 and 3, a bushing removal tool 50, according to the present invention, is provided that allows an operator (not shown) to manually extract the bushing 30. The bushing removal tool 50 is hand-held, so that the bushing 30 can be pushed out of the mounting aperture 24 while the power steering mechanism 10 is still positioned on the vehicle 12.

The bushing removal tool 50 includes a pressing mechanism 52, such as a ball joint press. The pressing mechanism 52 is generally C-shaped. Preferably, the pressing mechanism 52 includes a first opening 54, such as a circular opening, at an upper end and a second opening 56, such as a threaded opening, at a lower end. The bushing removal tool 50 also includes a threaded rod 60 threaded into the second opening 56 of the pressing mechanism 52. It should be appreciated that, in this example, an upper end of the threaded rod 60 includes a cavity 62 for receiving a bushing press adaptor 64.

The bushing press adaptor 64 is a solid cylinder. Preferably, a first diameter of a lower end 66 of the bushing press adaptor 64 is complementary to a diameter of the cavity 62 in the threaded rod 60, so that the lower end 66 of the bushing press adaptor 64 fits into the cavity 62 of the threaded rod 60. Also, a second diameter of an upper end 68 of the bushing press adaptor 64 is complementary to the diameter of the bushing 30, so that the upper end 68 of the bushing press adaptor 64 can push the bushing 30 out of the mounting aperture 24 in a manner to be described.

The bushing removal tool 50 further includes a bushing receiver 70 for receiving the bushing 30 as it is being pressed out. The bushing receiver 70 is cup-shaped, such that it is open at a lower end 72 and closed at an upper end 74. Preferably, an outside surface of the closed upper end 74 of the bushing receiver 70 includes a head 76 for attaching the bushing receiver 70 to the pressing mechanism 52 in a manner to be described. The head 76 is a cylindrically shaped solid head, having a diameter complementary to the first opening 54 in the pressing mechanism 52, so that the head 76 fits into the first opening 54 of the pressing mechanism 52.

Figure 4:
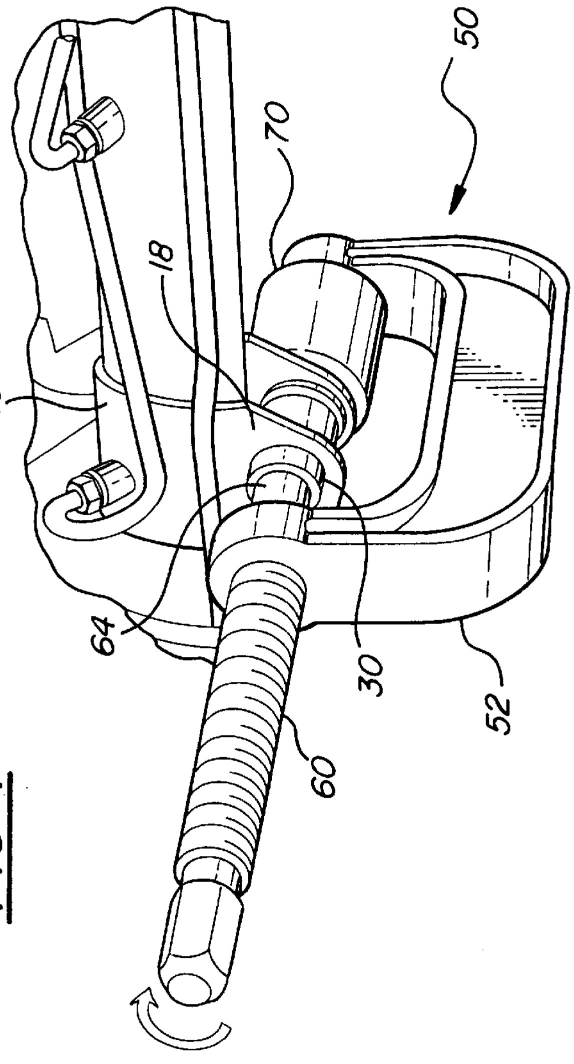
FIG. 4 is a perspective view of the bushing removal tool of FIG. 3 removing a bushing from the rack and pinion gear of FIG. 1.

Referring to FIGS. 4, 5 and 6, the operation of the bushing removal tool 50 is illustrated. For example, the bushing 30 is made accessible, such as by removing a bolt 22 that fits within the mounting aperture 24 of the rack and pinion gear 16. The threaded rod 60 is threaded into the second opening 56 of the pressing mechanism 52, such as by turning the threaded rod 60 clockwise, until the threaded rod 60 clears the pressing mechanism 52. The lower end 66, of the bushing press adaptor 64 is placed in the cavity 62 in the upper end of the threaded rod 60. The head 76 of the bushing receiver 70 is placed in the first opening 54 in the upper end of the pressing mechanism 52. The bushing removal tool 50 is placed around the installed bushing 30, such that the upper end 68 of the bushing press adaptor 64 is in contact with one face of the bushing 30, and the bushing receiver 70 is in contact with an opposing face of the bushing 30. It should be appreciated that the bushing press adaptor 64 and the bushing receiver 70 are held in place within the pressing mechanism 52 by the compression of the pressing mechanism 52. The threaded rod 60 is manually turned clockwise, in this example, causing the bushing press adaptor 64 to push against the bushing 30, forcing the bushing 30 out of the mounting aperture 24 and into the bushing receiver 70, as indicated at 102.

Referring to FIG. 5, the bushing removal tool 50 may include an adaptor plate 90. Under certain conditions, the mounting portion 18 may not have a sufficient surface area to provide adequate leverage for pushing out the bushing 30. An adaptor plate 90 positioned between the bushing receiver 70 and the mounting portion 18 increases the available surface area to obtain greater leverage in pushing out the bushing 30.

The adaptor plate 90 is a generally planer surface including an opening 92 for fitting around the bushing press adaptor 64. The sides of the adaptor plate opening 92 form a flanged surface 94. It should be appreciated that the diameter of the adaptor plate opening 92 is slightly larger than the outside diameter of the bushing receiver 70, so that the bushing receiver 70 sits within the adaptor plate opening 92.

In this example, one end 96 of the adaptor plate 90 includes a lip portion 98. The lip portion 98 may have a notch (not shown) cut out of an end to accommodate the shape of the mounting portion 18. The lip portion 98 enhances the stability of the adaptor plate 90 while extracting the bushing 30.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A bushing removal tool comprising:

a pressing mechanism;

a threaded rod threaded through said pressing mechanism;

a bushing press adaptor fitting onto an end of said threaded rod;

a bushing receiver fitting onto said pressing mechanism; and an adaptor plate positioned between said bushing receiver and the bushing, said adapter plate being generally planer and including an opening having a flanged side and an end having a stabilizing lip.

2. A bushing removal tool as set forth in claim 1 wherein said pressing mechanism is a ball joint press having a C-shape.

3. A bushing removal tool as set forth in claim 1 wherein an upper end of the threaded rod includes a cavity for holding said bushing press adaptor.

4. A bushing removal tool as set forth in claim 1 wherein said bushing press adaptor is a solid cylinder.

5. A bushing removal tool as set forth in claim 4 wherein a first diameter of a lower end of said bushing press adaptor is complementary to a diameter of said cavity.

6. A bushing removal tool as set forth in claim 4 wherein a second diameter of an upper end of said bushing press adapter is complementary to a diameter of the bushing.

7. A bushing removal tool as set forth in claim 1 wherein said bushing receiver is cup-shaped.

8. A bushing removal tool as set forth in claim 7 wherein said bushing receiver includes a solid cylindrically shaped head for fitting said bushing receiver into an opening in said pressing mechanism.

9. A bushing removal tool for a rack and pinion gear on a motor vehicle comprising:

a hand-held pressing mechanism;

a threaded rod threaded through a lower opening in said pressing mechanism;

a bushing press adaptor fitting onto an end of said threaded rod to push the bushing;

a bushing receiver fitting onto said pressing mechanism for receiving the bushing; and an adaptor plate positioned between said bushing receiver and the bushing, said adapter plate being generally planar and including an opening having a flanged side and an end having a stabilizing lip.

10. A bushing removal tool as set forth in claim 9 wherein said pressing mechanism is a ball joint press having a C-shape.

11. A bushing removal tool as set forth in claim 9 wherein an upper end of the threaded rod includes a cavity for holding said bushing press adaptor.

12. A bushing removal tool as set forth in claim 9 wherein said bushing press adaptor is a solid cylinder.

13. A bushing removal tool as set forth in claim 12 wherein a first diameter of a lower end of said bushing press adaptor is complementary to a diameter of said cavity.

14. A bushing removal tool as set forth in claim 12 wherein a second diameter of an upper end of said bushing press adapter is complementary to a diameter of the bushing.

15. A bushing removal tool as set forth in claim 9 wherein said bushing receiver is cup-shaped.

16. A bushing removal tool as set forth in claim 15 wherein said bushing receiver includes a solid cylindrically shaped head for fitting said bushing receiver into an opening in said pressing mechanism.

17. A tool for removing a bushing, the tool comprising:

a clamp body;

a rotatable member in threaded engagement with said clamp body, said rotatable member including an end for pushing the bushing;

a bushing receiver carried by said clamp body for receiving the bushing; and a generally planar plate positioned between said bushing receiver and said bushing, said plate defining an opening through which said bushing may pass and be deposited in bushing receiver.

18. The tool for receiving a bushing of claim 17, wherein said rotatable member includes a threaded rod and bushing press adaptor carried by said threaded rod which includes said end for pushing the bushing.

19. The tool for receiving a bushing of claim 17, wherein said opening of plate has a flanged side.

20. The tool for receiving a bushing of claim 17, wherein said plate includes an end with a stabilizing lip.

21. The tool for receiving a bushing of claim 17, wherein said bushing receiver defines a cavity for receiving the bushing.

* * * * *